United States Patent
Lazaridis et al.

(10) Patent No.: US 9,354,777 B2
(45) Date of Patent: *May 31, 2016

(54) METHOD FOR CREATING A PEER-TO-PEER IMMEDIATE MESSAGING SOLUTION WITHOUT USING AN INSTANT MESSAGING SERVER

(71) Applicant: BlackBerry Limited, Waterloo (CA)

(72) Inventors: Mihal Lazaridis, Waterloo (CA); Gerhard Dietrich Klassen, Waterloo (CA); Christopher R. Wormald, Kitchener (CA); Sherryl Lee Lorraine Scott, Etobicoke (CA)

(73) Assignee: BlackBerry Limited, Waterloo, Ontario (CA)

( * ) Notice: Subject to any disclaimer, the term of this patent is extended or adjusted under 35 U.S.C. 154(b) by 93 days.

This patent is subject to a terminal disclaimer.

(21) Appl. No.: 14/199,427

(22) Filed: Mar. 6, 2014

(65) Prior Publication Data

US 2014/0213309 A1 Jul. 31, 2014

Related U.S. Application Data

(63) Continuation of application No. 13/718,913, filed on Dec. 18, 2012, now Pat. No. 8,688,152, which is a continuation of application No. 12/783,202, filed on May 19, 2010, now Pat. No. 8,345,601, which is a (Continued)

(51) Int. Cl.
*H04W 4/00* (2009.01)
*G06F 3/0481* (2013.01)

(Continued)

(52) U.S. Cl.
CPC .......... *G06F 3/04817* (2013.01); *H04L 12/581* (2013.01); *H04L 12/5815* (2013.01);

(Continued)

(58) Field of Classification Search
None
See application file for complete search history.

(56) References Cited

U.S. PATENT DOCUMENTS

| 5,444,761 A | 8/1995 | Nagashima |
| 5,515,366 A | 5/1996 | Chieu et al. |

(Continued)

FOREIGN PATENT DOCUMENTS

| EP | 1009153 A1 | 6/2000 |
| EP | 1176840 A1 | 1/2002 |

(Continued)

OTHER PUBLICATIONS

Hiroyuki I.; Takeshi S.; Suguru Y.; Yuji O.; "Webhint: An Automatic Configuration Mechanism for Optimizing World Wide Web Cache System Utilization"; Proceedings of the 1998 Internet Society Conference (INET'98); Jul. 21, 1998.

(Continued)

*Primary Examiner* — Erika A Washington
(74) *Attorney, Agent, or Firm* — Gary S. Winer; Fleit Gibbons Gutman Bongini & Bianco P.L.

(57) ABSTRACT

A messaging method in a system including a wireless network, a routing server, and a plurality of mobile stations. A first mobile station has first communications applications and a first PIN and a second mobile station has second communications applications and a second PIN. The method includes sending an invitation including the first PIN from the first mobile station to the second mobile station using one of the first communications applications, and sending an acceptance including the second PIN from the second mobile station to the first mobile station using one of the second communications applications. The method further includes creating first messages including the second PIN and sending them to the second mobile station through the wireless network, and creating second messages including the first PIN and sending them to the first mobile station through the wireless network. The routing server routes the messages based on the PINs.

18 Claims, 10 Drawing Sheets

Related U.S. Application Data continuation of application No. 11/768,047, filed on Jun. 25, 2007, now Pat. No. 7,911,987, which is a continuation of application No. 10/942,167, filed on Sep. 16, 2004, now Pat. No. 7,236,472.

(60) Provisional application No. 60/503,367, filed on Sep. 16, 2003, provisional application No. 60/503,366, filed on Sep. 16, 2003.

(51) Int. Cl.

| | | |
|---|---|---|
| *H04L 12/58* | (2006.01) | |
| *H04M 1/725* | (2006.01) | |
| *H04W 4/12* | (2009.01) | |
| *H04W 40/02* | (2009.01) | |
| *H04W 88/06* | (2009.01) | |
| *H04L 29/08* | (2006.01) | |
| *H04L 29/06* | (2006.01) | |
| *H04W 8/18* | (2009.01) | |
| *H04W 8/22* | (2009.01) | |
| *H04W 40/24* | (2009.01) | |
| *H04W 76/02* | (2009.01) | |
| *H04W 80/10* | (2009.01) | |
| *H04W 4/16* | (2009.01) | |

(52) U.S. Cl.
CPC ............ *H04L12/5895* (2013.01); *H04L 51/04* (2013.01); *H04L 51/043* (2013.01); *H04L 51/38* (2013.01); *H04L 67/24* (2013.01); *H04L 69/24* (2013.01); *H04M 1/72547* (2013.01); *H04M 1/72563* (2013.01); *H04W 4/12* (2013.01); *H04W 40/02* (2013.01); *H04W 88/06* (2013.01); *H04L 63/08* (2013.01); *H04M 1/72566* (2013.01); *H04W 4/16* (2013.01); *H04W 8/18* (2013.01); *H04W 8/22* (2013.01); *H04W 40/248* (2013.01); *H04W 76/02* (2013.01); *H04W 80/10* (2013.01)

(56) References Cited

U.S. PATENT DOCUMENTS

| | | | |
|---|---|---|---|
| 5,793,365 A | 8/1998 | Tang et al. | |
| 5,802,460 A | 9/1998 | Parvulescu et al. | |
| 5,960,173 A | 9/1999 | Tang et al. | |
| 6,301,609 B1 | 10/2001 | Aravamudan et al. | |
| 6,317,593 B1 | 11/2001 | Vossler | |
| 6,519,639 B1 | 2/2003 | Glasser et al. | |
| 6,564,261 B1 | 5/2003 | Gudjonsson et al. | |
| 6,577,859 B1 | 6/2003 | Zahavi et al. | |
| 6,606,309 B1 | 8/2003 | Wang | |
| 7,035,865 B2 | 4/2006 | Doss et al. | |
| 7,139,797 B1 | 11/2006 | Yoakum et al. | |
| 7,236,472 B2 | 6/2007 | Lazaridis | |
| 7,315,747 B2 | 1/2008 | Klassen et al. | |
| 7,911,987 B2 | 3/2011 | Lazaridis et al. | |
| 8,345,601 B2 | 1/2013 | Lazaridis et al. | |
| 8,688,152 B2* | 4/2014 | Lazaridis et al. | 455/466 |
| 2001/0041590 A1 | 11/2001 | Silberfenig et al. | |
| 2002/0075303 A1 | 6/2002 | Thompson et al. | |
| 2002/0087649 A1 | 7/2002 | Horvitz | |
| 2002/0128036 A1 | 9/2002 | Yach et al. | |
| 2002/0143916 A1 | 10/2002 | Mendiola et al. | |
| 2003/0013467 A1 | 1/2003 | Caloud | |
| 2003/0018726 A1 | 1/2003 | Low et al. | |
| 2003/0065721 A1 | 4/2003 | Roskind | |
| 2003/0086402 A1* | 5/2003 | Yang | 370/338 |
| 2003/0126213 A1 | 7/2003 | Betzler | |
| 2003/0217098 A1 | 11/2003 | Bobde et al. | |
| 2004/0059781 A1* | 3/2004 | Yoakum et al. | 709/204 |
| 2005/0027716 A1 | 2/2005 | Apfel | |
| 2006/0101266 A1 | 5/2006 | Klassen et al. | |
| 2007/0042815 A1 | 2/2007 | Trap | |
| 2008/0261636 A1 | 10/2008 | Lau et al. | |

FOREIGN PATENT DOCUMENTS

| | | | |
|---|---|---|---|
| EP | 1233570 A1 | 8/2002 | |
| EP | 1331786 A1 | 7/2003 | |
| EP | 1385323 A1 | 1/2004 | |
| WO | WO 99/12365 A1 | 3/1999 | |
| WO | WO 02/065250 A2 | 8/2002 | |
| WO | WO 03/034672 A1 | 4/2003 | |
| WO | WO 03/058908 A2 | 7/2003 | |

OTHER PUBLICATIONS

Squid Developers; "Squid Programmers Guide"; internet article [online] Aug. 11, 2004; retrieved on Aug. 1, 2006 from http://www.squid-cache.org/Doc/Prog-Guide/ (copy of archive attached).

Vetter, B. et al.; "An Experimental Study of Insider Attacks for the OSPF Routing Protocol"; 1997; pp. 1 to 17; ICN.

Acampora, A.S. et al.; "Control and Quality-of-Service Provisioning in High-Speed Microcellular Networks"; IEEE Personal Communications Magazine; 1994; vol. 1, No. 2.

Tanembaum, A.; Computer Networks (Fourth Edition); Jan. 1, 2003; p. 7; ISBN: 978-0-13038488.

Lastoria, G.; Supplementary Search Report from European Application No. 04761845.9; search completed Aug. 22, 2006.

Lastoria, G.; Supplementary Search Report from European Application No. 04761846.7; search completed Aug. 24, 2006.

Lastoria, G.; Search Report from European Application No. 04761847.5; search completed Oct. 11, 2006.

Lastoria, G.; Search Report from European Application No. 08166369.2; search completed Mar. 12, 2009.

Lastoria, G.; Search Report from European Application No. 10156600.8; search completed Apr. 20, 2010.

Lastoria, G.; Search Report from European Application No. 10178664.8; search completed Oct. 14, 2010.

Lastoria, G.; Search Report from European Application No. 10184719.2; search completed Nov. 24, 2010.

* cited by examiner

| Quick Messaging: 'Available' | | 12:30 PM |
|---|---|---|
| ONLINE (25 total) Availability | | Last Msg |
| Tom Jones | - available | 06:50 pm |
| Bud Auto | - on the phone | 11:20 am |
| Evil Kneivel | - idle | Yesterday |
| Madonna | - available | 11:30 am |
| Mr. Smith | - currently typing | 4 minutes |
| Harry Smith | - in meeting | 09:30 am |
| Bert Smith | - ignoring data | 10:35 am |
| Mike Ham | - data delivered | 12:23 pm |
| My Wife | - data read | 12:29 pm |
| My boss | - unread data | 12:30 pm |
| Friend A | - turned off | 09:40 am |
| Friend B | - Blocking QM | Yesterday |

FIG. 6

METHOD FOR CREATING A PEER-TO-PEER IMMEDIATE MESSAGING SOLUTION WITHOUT USING AN INSTANT MESSAGING SERVER

CROSS-REFERENCE TO RELATED APPLICATIONS

This application is a continuation of co-pending U.S. application Ser. No. 13/718,913 filed on Dec. 18, 2012, and issued on Apr. 1, 2014 as U.S. Pat. No. 8,688,152, which is a continuation of U.S. application Ser. No. 12/783,202 filed on May 19, 2010, and issued on Jan. 1, 2013 as U.S. Pat. No. 8,345,601, which is a continuation of U.S. application Ser. No. 11/768,047 filed on Jun. 25, 2007, and issued on Mar. 22, 2011 as U.S. Pat. No. 7,911,987, which is a continuation of U.S. application Ser. No. 10/942,167 filed on Sep. 16, 2004, and issued on Jun. 26, 2007 as U.S. Pat. No. 7,236,472, which claimed the benefit of U.S. Provisional Application No. 60/503,367 filed on Sep. 16, 2003, and U.S. Provisional Application No. 60/503,366 filed on Sep. 16, 2003, all of which are incorporated herein by reference.

BACKGROUND OF THE INVENTION

1. Field of the Invention

The invention relates generally to a messaging solution for mobile stations such as cell phones, smart phones, personal data assistants (PDAs), pagers, handheld computers, phone-enabled laptop computers, and other mobile electronic devices, and more particularly, to a peer-to-peer immediate messaging solution for mobile stations that does not utilize an instant messaging server or the like that tracks state information, such as presence and "buddy list" information, for each mobile station.

2. Description of the Related Art

Instant messaging (IM) is a service that alerts users when another individual, such as a friend or colleague, is online and allows them to send messages to each other in real time, without the store-and-forward delays inherent in an electronic mail solution. With instant messaging, each user creates a list of other users with whom he or she wishes to communicate (commonly referred to as "buddy lists"). An instant messaging server keeps track of the online status of each of its subscribed users (often referred to as presence information), and when someone from a user's buddy list is online, the service alerts that user and enables immediate contact with the other user.

IM solutions are multiplying quickly and are showing up not only in land-line environments but also in wireless environments used by mobile stations such as cell phones, smart phones, personal data assistants (PDAs), pagers, phone-enabled laptop computers, and other mobile electronic devices. Wireless environments offer the potential for strong IM solutions, based on the time a user carries their mobile station with them. The number of available mobile stations that can run IM solutions is in the hundreds of millions.

It is well known in the art to port IM clients to a mobile station in order to gain access to one of the many IM services available. These services include AOL's Instant Messenger (AIM), ICQ, Yahoo! and Microsoft's MSN Messenger products. These products are known to have tens of millions of users supported by each IM server, and these communities are sometimes inter-connected to produce even larger communities. However, land-line and desktop-based IM solutions fall short of what a user that is often mobile wants and needs, namely good IM functionality wherever they may be with their mobile station. Additionally, the small screens and memories of mobile stations often result in a frustrating experience for people on the road trying to use IM. These people are forced to accept the poor performance and experience of existing IM solutions because they want or need to reach land-line users operating legacy desktop IM solutions and have no other alternatives to select from. There is thus a need for a better and more complete messaging solution (that enables immediate messaging like IM) that is designed for wireless mobile electronic devices that can take advantage of the "always on" nature of a mobile station.

Another major problem with existing IM applications in a wireless environment is that existing IM applications require the frequent exchange of messages between the client and server to indicate when a user is available. These frequent messages, which increase network traffic, are problematic for wireless networks because the bandwidth of a wireless network is very limited and the cost of data exchange is very high. This problem is further compounded by the reduction of mobile station battery life by transmitting lots and lots of small messages around to keep track of presence information, buddy lists and buddy status. These small messages are compounded by the fact that "presence update" information is being exchanged between correspondents constantly.

Yet another major problem with existing IM applications is the lack of security in the systems for corporate users. Although it is true that the exchange between users could be encrypted, this does not solve the problem of my instant messaging identity being passed around between users. Also, the problem of authenticating who is inviting me to IM with them has not been solved.

Another common wireless messaging standard is short message service (SMS), used throughout North America and especially in European China and India. This service also has many flaws. First, the addressing of each SMS user must be performed through their MSISDN, or telephone number. This phone number is extremely easy to pass around and it is impossible to verify the authenticity of the sender. Second, there is no implied presence, or any actual delivery information, so the exchange of information has a lot of risk associated with it. SMS also has no concept of a conversation that lasts forever, and in fact there are no SMS devices that keep long-term status information regarding an SMS conversation with another party.

SUMMARY OF THE INVENTION

A system and method provide for immediate peer-to-peer messaging between mobile stations that overcomes many of the problems associated with known prior art IM solutions. Because the system and method do not require a server that tracks state information such as presence and buddy list information, the volume of data exchange is reduced. In addition, the system and method provide increased security because the underlying address identity of each user of a mobile station in the system is kept secret and because invitations to engage in peer-to-peer messaging cannot be passed around to other users. Furthermore, availability information is exchanged between users and enhances the user experience by providing information as to whether another user is likely to respond to a particular message.

These and other aspects of the invention are provided by a system including a wireless network, a routing server coupled to the wireless network, and a plurality of mobile stations, and a method of exchanging messages between a first mobile station and a second mobile station in such a system. The first mobile station is provided with one or more first communications applications and a first personal identification number and the second mobile station is provided with one or more second communications applications and a second personal identification number. The first and second communications applications may include one or more existing communications applications, such as a wireless telephone application, an email application, a short message service (SMS) application, a multimedia messaging service (MMS) application, and an enhanced message service (EMS) application. The first and second mobile stations are also provided with a peer-to-peer messaging application that implements the invention.

The method includes sending an invitation message that includes the first personal identification number from the first mobile station to the second mobile station using one of the first communications applications, and sending an acceptance message that includes the second personal identification number from the second mobile station to the first mobile station using one of the second communications applications. After these steps, the method further includes creating one or more first messages that each includes the second personal identification number and sending the first messages to the second mobile station through the wireless network using the routing server. The routing server routes the first messages based on the second personal identification number. The method also includes creating one or more second messages that each includes the first personal identification number and sending the second messages to the first mobile station through the wireless network using the routing server. The routing server routes the second messages based on the first personal identification number. The routing server does not track any state information for any of the mobile stations, such a presence information or buddy list information.

The method may further include sending a second invitation message including the first personal identification number from the first mobile station to the second mobile station using another one the first communications applications. In this case, the second mobile station may be permitted to accept the invitation message only if both invitation messages are received by the second mobile station.

In one particular embodiment, a phone call may be placed from the first mobile station to the second mobile station over a voice circuit. In this case, the invitation message comprises a plurality of first DTMF tones sent from the first mobile station to the second mobile station over the voice circuit, and the acceptance message comprises a plurality of second DTMF tones sent from the second mobile station to the first mobile station over the voice circuit.

The first mobile station may, according to an aspect of the invention, periodically send a first availability information message to the second mobile station through the routing server and the second mobile station may periodically send a second availability information message to the first mobile station through the routing server. The availability information messages may be derived from a current operational state of the mobile station in question, and may relate to a specific state of or an event occurring on the mobile station in question. In addition, each mobile station may periodically send such availability information messages to all of the mobile stations in its contact database.

BRIEF DESCRIPTION OF THE DRAWINGS

A full understanding of the invention can be gained from the following Description of the Preferred Embodiment when read in conjunction with the accompanying drawings in which:

FIG. 6 is an illustration of the main Quick Messaging screen with a wide range of conversations with varying availability statuses shown.

Similar numerals refer to similar parts throughout the specification.

DESCRIPTION OF THE PREFERRED EMBODIMENT

Figure 1:
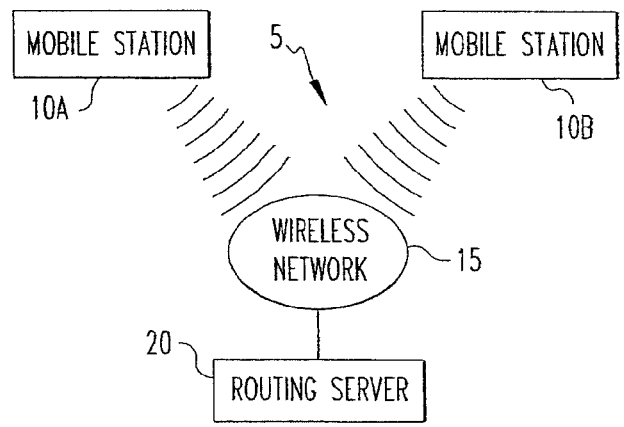
FIG. 1 is a block diagram of a system enabling immediate peer-to-peer messaging between mobile stations according to the invention.

FIG. 1 is a block diagram of a system 5 for enabling immediate peer-to-peer messaging according to the invention. System 5 includes a plurality of mobiles stations 10, such as mobile stations 10A and 10B shown in FIG. 1, which may be any type of wireless mobile electronic communications device such as a cell phone, a smart phone, a personal data assistant (PDA), a pager, a handheld computer or a phone-enabled laptop computer, to name a few. As is known, each mobile station 10 may be provided with various applications, including, without limitation, one or more currently existing applications that enable communication with other mobile stations 10, such as a wireless telephone application, an email application, a short message service (SMS) application, a multimedia messaging service (MMS) application, an enhanced message service (EMS) application, and other Internet enable messaging applications (each of which may be referred to herein as an "existing communications application"). In addition, each mobile station 10 is provided with an application that implements the peer-to-peer messaging solution of the invention as described herein (referred to herein as the "peer-to-peer messaging application"). The term "application" as used herein shall include one or more programs, routines, subroutines, function calls or other type of software or firmware and the like, alone or in combination. System 5 also includes wireless network 15, which may be any wireless communications network or combination of interconnected networks, including, without limitation, Mobiltex™, DataTAC™, AMPS, TDMA, CDMA, GSM/GPRS, PCS, EDGE, UMTS or CDPD. As is known, wireless network 15 includes a plurality base stations that perform radio frequency (RF) protocols to support data and voice exchanges with mobile stations 10A and 10B. Routing server 20 is coupled to wireless network 15. Routing server 20 may be any type of routing equipment capable of quickly routing data packets, including, without limitation, a TCP/IP router such as those sold by Cisco Systems, Inc. of San Jose, Calif., or a network address translation server (NAT).

Each mobile station 10 of system 5 is assigned and stores a unique personal identification number (PIN). The PIN for each mobile station 10 may be assigned and stored therein when it is manufactured or through its subscriber identity module (SIM). Each PIN is mapped to a network address for the corresponding mobile station 10 on wireless network 15 that enables data to be routed to the mobile station 10. Routing server 20 includes one or more routing tables for routing messages sent by mobile stations 10 based on this mapping. In one exemplary embodiment, the PIN may actually be the network address itself, and in another exemplary embodiment, the PIN may be the phone number of the mobile station 10 or a unique ID such as the mobile subscriber ISDN (MSISDN) for the mobile station 10, and the network address may be an IP address or the like.

For convenience in describing the establishment and maintenance of a peer-to-peer messaging session between two mobile stations 10 according to the invention, reference will be made to mobile station 10A and 10B shown in FIG. 1. It will be appreciated, however, that the same description will apply to a peer-to-peer messaging session between any two mobile stations 10. When a user of mobile station 10A wants to establish a peer-to-peer messaging session according to the invention with another mobile station 10, such as mobile station 10B, mobile station 10A creates and sends an invitation to mobile station 10B using one or more of the existing communications applications common to both mobile station 10A and mobile station 10B. Preferably, this is facilitated and accomplished through the peer-to-peer messaging application using appropriate menus and/or dialog boxes displayed to the user on a display of mobile station 10A. The invitation in each case consists of a message appropriate for the particular existing communications application, such as an email, SMS, EMS, or MMS message or a wireless telephone call, that includes: (1) some form of a request as to whether the user of mobile station 10B wants to accept the invitation and establish a peer-to-peer messaging session with mobile station 10A using mobile station 10B, (2) a file or portion thereof that includes the PIN of mobile station 10A, and (3) an indicator(s) that indicates that the message is for a peer-to-peer messaging session using the peer-to-peer messaging application. As described in greater detail hereinafter, item (3) is a data element that identifies the invitation message as being a special type of message and causes the peer-to-peer messaging application of mobile 10 to be activated upon receipt thereof. If the user of mobile station 10B desires to establish a peer-to-peer messaging session with mobile station 10A, the user of mobile station 10B will respond to the invitation with an acceptance message using the appropriate existing communications application that includes: (1) some form of confirmation to the user of mobile station 10A that the user of mobile station 10B desires to establish a session, (2) a file or portion thereof that includes the PIN of mobile station 10B, and (3) an indicator(s) that indicates that the message is for a peer-to-peer messaging session using the peer-to-peer messaging application. Again, this is preferably facilitated and accomplished through the peer-to-peer messaging application using appropriate menus and/or dialog boxes displayed to the user on a display of mobile station 10B. Preferably, whenever a PIN is sent from one mobile station to another, it is transmitted in a coded (such as with a hash function) and/or encrypted format, and each of the mobile stations 10 of system 5 is provided with information that is necessary to decode and/or decrypt such PINs when received.

As will be appreciated, once the above steps are complete, mobile station 10A will have the PIN for mobile station 10B, and mobile station 10B will have the PIN for mobile station 10A. Now, if either mobile station 10A or 10B desires to send a peer-to-peer message to the other, it prepares a peer-to-peer message using the peer-to-peer messaging application that includes the PIN of the recipient mobile station 10 (10A or 10B, as the case may be), preferably in the message header, along with the message information that is to be sent. The peer-to-peer message is then sent by the mobile station 10 through wireless network 15 to routing server 20. Routing server 20 obtains the PIN from the peer-to-peer message and uses it to determine the network address of the recipient mobile station 10 (10A or 10B, as the case may be) using the routing table(s) stored therein, and sends the message to the recipient mobile station 10 (10A or 10B, as the case may be) through wireless network 15 using the determined network address. Once received, the peer-to-peer message, and in particular the message information contained therein, may be displayed to the user of the recipient mobile station 10 (10A or 10B, as the case may be).

According to one embodiment of the invention, security may be increased in peer-to-peer messaging by sending invitations as described above over multiple communication paths using multiple existing communications applications. As will be appreciated, each communication path confirms a different address identity for the sender of the invitation, thus helping to confirm the authenticity of the invitation. For example, the user of mobile station 10A may wish to establish a peer-to-peer messaging session with the user of mobile station 10B by sending an invitation as described above using both an email application and an SMS application. In this case, when the invitation messages are received by mobile station 10B, the "inbox" or the like of mobile station 10B will show two messages from mobile station 10A, i.e., the email invitation and the SMS invitation. When the messages arrive, the user of mobile station 10B could be working in any application of mobile station 10B, such as the calendar application, the address book application, the browser application or the phone application, or not currently using mobile station 10B at all (although it is powered on). The user will be notified of the arrival of the invitation messages in the same manner as any other message received by mobile station 10B (e.g., by beeping and/or vibrating). When the user of mobile station 10B opens either of these two messages, the peer-to-peer messaging application will be invoked to process the message. As will be appreciated by those of skill in the art, the automatic invocation of the peer-to-peer messaging application may be accomplished by providing each invitation message, regardless of form, with special indicators to indicate that it is an invitation for a peer-to-peer messaging session and by programming the peer-to-peer application to monitor all incoming messages for such indicators. In addition, each invitation message, when created within the peer-to-peer messaging application, will include an indication of the number (over different paths) of invitation messages that were sent. In the case where multiple paths are used, as in this example, the peer-to-peer messaging application will next scan the "inbox" or the like for the other invitation message(s). For example, if the email invitation message is opened first, the peer-to-peer application will scan the "inbox" or the like for the SMS invitation message. As described above, the invitation messages may be identified by the special indicators provided therewith. The peer-to-peer messaging application in this embodiment will not provide the user of mobile station 10B with the ability to accept the invitation until the other invitation message(s) is found. Once the other invitation message(s) is found, the user of mobile station 10 may accept the invitation as described above, reject the invitation, or postpone the decision to accept or reject.

According to another particular embodiment of the invention, a peer-to-peer messaging conversation may be established using a telephone call such as a circuit switched cell phone call. In particular, again using mobile stations 10A and 10B as an example, mobile station 10A first initiates a phone call to mobile station 10B through wireless network 15 using the phone application of mobile station 10A, which call is answered by mobile station 10B using its phone application. Use of a phone call to initiate the session allows for voice authentication of each party to be performed, thereby increasing security. While the call is open between mobile station 10A and mobile station 10B, mobile station 10A, at the request of the user of mobile station 10A (such as through an appropriate menu selection and/or dialog box displayed on mobile station 10A), sends a peer-to-peer messaging invitation to mobile station 10B consisting of a series of Dual Tone Multi-Frequency (DTMF) tones through the voice circuit already connected between mobile station 10A and mobile station 10B. This invitation will, as described above, include the PIN of mobile station 10A. Upon receipt of the DTMF invitation message, the peer-to-peer messaging application of mobile station 10B will notify the user of mobile station 10B of the invitation and provide the user the option of accepting, rejecting, or postponing a decision on the invitation, such as through a dialog box or the like displayed to the user. If the user of mobile station 10B accepts, the peer-to-peer messaging application of mobile station 10B causes an acceptance response message to be sent to mobile station 10A consisting of a series of DTMF tones sent through the voice circuit already connected between mobile station 10A and mobile station 10B. These DTMF tones will include the PIN of mobile station 10B. At this point, mobile station 10A and mobile station 10B will have exchanged the information necessary to carry on a peer-to-peer messaging session, and the parties may begin to exchange such messages in the manner described above. As will be appreciated, alternatives to sending and receiving information over the voice channel include analog modem techniques and non-DTMF tones, and may be substituted for DTMF tones in this embodiment.

According to another aspect of the invention which increases security, the PIN of each mobile station 10 is kept secret. This allows each user of each mobile station 10 to control who has access to the user's "network identity," i.e., the PIN. Without such a safeguard, a user's network identity may be shared broadly and without their control. This can be accomplished in a number of ways. A simple method is just to encode the PIN as a binary attachment to a message such as an email. In this way, the information is made available to the software of a mobile station 10, but is not readily available to the user. If the attachment also contains a binary specification of the intended recipient (e.g. their email address), then the software may only allow the user to accept the invitation if their email address matches that of the intended recipient. Note that, with this mechanism, the user may be able to view the PIN if they are able to view the binary attachment data. The system can be made more secure in a number of ways. For example, the PIN may be encrypted using a key known by both the sender and recipient, or obfuscated using an algorithm known by both the sender and recipient.

Figure 2:
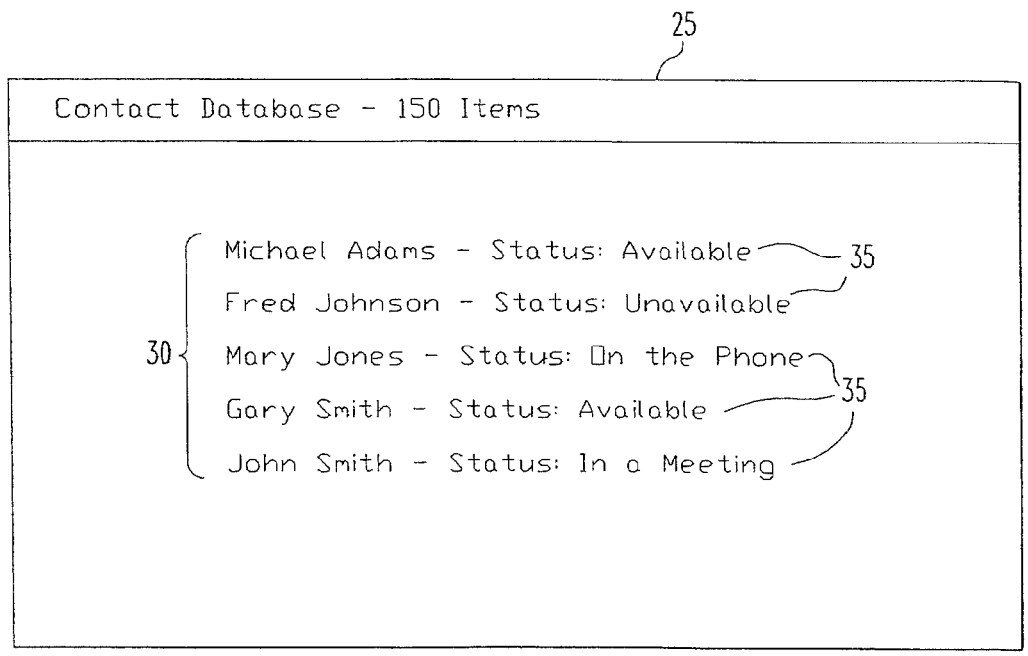
FIG. 2 is a view of a portion of a display of a mobile station showing an exemplary contact database screen which is part of a peer-to-peer messaging application according to the invention.

According to an aspect of the invention, the peer-to-peer messaging application of each mobile station 10 includes a contact database that stores the name and/or other identifying information and corresponding PIN for each user of another mobile station 10 with whom the user of the mobile station 10 has communicated or may wish to communicate using the peer-to-peer messaging application. This contact database is thus similar to the "buddy lists" that are part of IM applications. User and PIN information may be added to and stored in the contact database each time the user establishes a peer-to-peer messaging session with another user, or simply by a user entering the information obtained from another user in a different manner. Entries may also be selectively deleted from the contact database by a user. FIG. 2 is a view of a portion of a display of a mobile station 10 showing an exemplary contact database screen 25 which is part of the peer-to-peer messaging application and displays a listing 30 of contacts stored in the contact database. As seen in FIG. 2, contact database screen 25 also provides status information 35 for each contact listed in listing 30 that relates to the likely availability of the particular contact to participate in a peer-to-peer messaging session, referred to as "implied availability." This availability information is discussed in greater detail below.

According to a further aspect of the invention, each mobile station 10 (referred to as the "first mobile station 10" for clarity) periodically transmits, such as every ten minutes to minimize data traffic, availability information pertaining to it to the mobile stations 10 of each of the users listed in the contact database of the first mobile station 10 (referred to as the "other mobile stations 10" for clarity) through wireless network 15 and routing server 20 using the stored PIN of each of those users. In one particular embodiment, if any of the other mobile stations 10 is off or out of coverage range, routing server 20 will queue a number of availability information messages intended for such other mobile stations 10, and will deliver them once the other mobile stations 10 are turned on or are back in coverage range. The availability information, which will change over time, is derived from the current operational state of the first mobile station 10. The availability information is intended to provide an indication of the user's activity in the first mobile station 10 in order to give each of the users of the other mobile stations 10 in the contact database an estimate of how likely it is that the user of the first mobile station 10 will read and reply to a peer-to-peer message sent to the user of the first mobile station 10. Thus, because all of the mobile stations 10 in system 5 (unless disabled as described below) transmit their availability information to all of their contacts, it will be appreciated that each mobile station 10 in system 5 will have availability information for each of the other users in its contact database. As a result, a user of any mobile station 10 will be able to consult the availability information of any of the contacts listed in contact database of the mobile station 10 to get an idea as to whether a particular contact is likely to receive and respond to a peer-to-peer message, which information may effect the decision as to whether to send a peer-to-peer message at all.

The availability information may consist of a general status indicator such as "available," indicating, for example, that the mobile station 10 is powered on and in range of the wireless network 15 and not actively utilizing an application that would prevent a peer-to-peer message from being received, such as being engaged in a phone call using the telephone application, or "unavailable," indicating, for example, that the mobile station 10 is powered off or out of range of the wireless network 15. In addition, the availability information may relate to specific states of or events occurring on the mobile station 10, such as ignoring incoming telephone calls, the user powering the mobile station 10 off, the first mobile station 10 being involved in a current telephone call, the user of the first mobile station 10 being in a meeting as indicated by an entry in the calendar application provided in the mobile station 10, or the user of the mobile station 10 is currently using the peer-to-peer messaging application. As will be appreciated, the availability information may be tied to and derived from every action of and/or piece of information available within the mobile station 10, and that the specific examples listed above are meant to be exemplary only and not limiting. In addition, the general status indicators may comprise a number of levels or degrees of availability based upon information relating to the specific states of and/or events occurring on the mobile station 10. In such a case, availability information may be reported on a scale indicating the various levels or degrees of availability, such as "Available-Level 1," "Available-Level 2," and so on. In addition, if a given user of a mobile station 10 does not want their availability to be tracked this closely, they may selectively prevent their mobile station 10 from transmitting availability information. A more detailed discussion of the generation and provision of availability information is provided in commonly owned U.S. application Ser. Nos. 10/942,749 and 10/942,305, entitled "Handheld Electronic Device and Associated Method Providing Availability Data in a Messaging Environment," the disclosures of which are hereby incorporated into the present application by reference.

Figure 3:
FIG. 3 is a view of a portion of a display of a mobile station showing an exemplary status screen forming a part of a peer-to-peer messaging application according to the invention.

FIG. 3 is a view of a portion of a display of a mobile station 10 showing an exemplary status screen 40 forming a part of the peer-to-peer messaging application according to the invention. Status screen 40 is the main screen of the peer-to-peer messaging application and provides the user of the mobile station 10 with overall status information relating to the peer-to-peer messaging application. In particular, status screen 40 provides information relating to various groups, including a current conversations group 45, a blocked correspondents group 50 and a pending conversations group 55. The current conversations group 45 lists and provides information relating to all of the peer-to-peer messaging sessions, also referred to as conversations, in which the mobile station 10 is currently engaged. A current conversation means either that the mobile station 10 has sent an invitation as described above to another mobile station 10 and has received an acceptance message as described above in return, or that another mobile station 10 has sent the mobile station 10 an invitation as described above and the mobile station 10 has responded with an acceptance message as described above. The blocked correspondents group 50 provides a listing of users of other mobile stations 10 from whom the user of this mobile station 10 no longer wishes to receive peer-to-peer messages; their messages will be blocked and not displayed to the user. Preferably, "unavailable" availability information is transmitted by the mobile station 10 to each of the blocked correspondents. Alternatively, peer-to-peer messages from users of other mobile stations 10 from whom the user of this mobile station 10 no longer wishes to receive peer-to-peer messages may be blocked and not displayed to the user by removing such other users from the contact database; in this case, the peer-to-peer messaging application will be adapted to block messages from any user not listed in the contact database. The pending conversations group 55 provides information relating to all of the currently pending conversations of the mobile station 10. A pending conversation means either that the mobile station 10 has sent an invitation as described above to another mobile station 10 and has not yet received a response, or that another mobile station 10 has sent the mobile station 10 an invitation as described above and the mobile station 10 has not yet responded.

The current conversations group 45, the blocked correspondents group 50 and the pending conversations group 55 may be selectively expanded, where additional information is displayed, or collapsed, where additional information is not displayed. Each of the current conversations group 45, the blocked correspondents group 50 and the pending conversations group 55 is shown in FIG. 3 in expanded from. A user may selectively toggle between the expanded and collapsed states by providing an input into the mobile station 10 through an input apparatus, such as a plurality of keys and/or a rotating thumbwheel, included as part of the mobile station 10. In the expanded state, the current conversations group 45 lists for each current conversation: (1) the user associated with the other mobile station 10, (2) availability information relating to the other mobile station 10, and (3) the date and/or time of the most recent message sent or received. Since a peer-to-peer messaging session can remain open and active for long periods of time, e.g., weeks or months, item (3) provides a quick reference as to which conversations are most active and current. In the expanded state, the pending conversations group 55 lists for each pending conversation: (1) the user associated with the other mobile station 10, and (2) availability information relating to the other mobile station 10. As seen in FIG. 3, an icon 60 indicative of the availability information is preferably provided next to each entry in the current conversations group 45 and the pending conversations group 55 for ease of reference for the user.

Thus, the above provides a system and method for immediate peer-to-peer messaging between mobile stations that overcomes many of the problems associated with known prior art IM solutions. Because, unlike an IM server, routing server 20 does not track state information such as presence and buddy list information, the volume of data exchange is reduced. In addition, security is increased because the underlying address identity of each user is kept secret and because messaging invitations cannot be passed around to other users. Furthermore, availability information exchanged between users enhances the user experience by providing information as to whether another user is likely to respond to a particular message.

Turning now to FIGS. 4 to 13, many of the problems when using IM on a mobile station can be solved using other embodiments. Such other embodiments use a concept called Quick Messaging and stateless peer-to-peer routing to connect one or more users to their destinations. The stateless peer-to-peer routing means that there is no central IM server and therefore there is no need to propagate presence information to all buddies in one person's buddy list. The routing center does not keep state information on each mobile, for example presence, or buddy list information. By virtual of the stateless link, and the always-on, always-connected nature of mobile stations, two correspondents can have conversations that last indefinitely. Once initiated, the decision to terminate conversation or change the status could be months or years.

These embodiments may also use the underlying transport and delivery information to imply presence information for correspondents that are configured on each mobile station. In other words, as information is delivered, or activity takes place between mobile stations, presence and status information is updated to reflect these interactions. The advantage of an always-on, always-connected mobile station is that the delivery of information to the mobile station can allow assumptions to be made about its availability. Even if a user wishes to make themselves temporarily unavailable, the change does not have to be propagated to all their other correspondents. If a message is received and rejected on the mobile station, only the sender is informed that the person is unavailable. Other mobile stations that are not in an active conversation with an unavailable user, do not need to immediately know they the user is temporarily unavailable. This helps to reduce overall traffic between mobile stations, it saves wireless network resources and helps to length battery life on each mobile station. The over-used concept of 'presence information', which can be updating constantly, is replaced with 'implied availability'. Implied availability used the various delivery, PIM functions and activities of a mobile station to implied what availability is for the user. This new status update method called 'implied availability', reduces the intense traffic demands of Instant Messaging. As a user stops sending Quick Messaging to any of their correspondence, their implied state moves to idle. Once the user sends a message to any of their correspondence their state changes to available. As the user's calendar on their device indicates they have a meeting, a state change is sent to all correspondence to indicate they are unavailable. This ability to change state directly with each correspondent means that a central server is not required and that direct peer-to-peer Quick Messaging can grow and change as the community of user's grows. Another huge advantage of having Quick Messaging sessions last forever is when the mobile station is powered on either after a reset, battery change or just after being turned off for a longer period of time. The state information is implied for the correspondents and does not have to be exchanged right at the moment. The user can attempt to contact anyone and his or her status information will be inferred based on the ability to send and deliver the message.

The Quick Messaging solution provides two authentic mechanisms to help ensure that security is maintained when accept Quick Messaging invitations. When requested, a person sending a Quick Messaging invitation can transmit the invitation over multiple communication paths. Each communication path confirms a different address identity for the sender, thus helping to confirm that authenticity of the sender's request. For example if a Quick Messaging request is sent it could be sent over e-mail and SMS to the receiver. Alternatively, an initiator could make a cell phone call so that voice authentication can be performed and the invitation can then be sent over the call phone call using DTMF tones. Once the DTMF tones are received and interpreted, the receiver could be prompted to accept and the response could be back using DTMF tones to the initiator. When sending requests over two data paths, once the receiver receives both requests, they can open either one to confirm the invitation and authentication of the sender. An underlying Quick Messaging application can monitor for these activities and correlate the two different requests from the sender.

Another added security feature is that Quick Messaging identities are private and cannot be revealed or exchanged. For example when an invitation sent from person A, to person B, it is not possible for person B to forward this invitation to person C. An invitation sent from person A, can ONLY be received by person B it cannot be forwarded and then accepted by any other mobile station. Additionally the 'underlying' wireless identity of the parities is not visible. There is a binary attachment with each invitation that contains the mobile station's id, this cannot be viewed or passed around using normal or casual methods currently available in all Instant Messaging systems. The result is that only people that have been truly invited to have a Quick Messaging conversation are the people that can accept the conversation. This eliminates impersonation, junk and spam messages and uncontrolled proliferation of Quick Messaging identities.

Addressing is handled by assigning personal PIN identifies to each mobile station, either in manufacturing or through their Subscriber Identity Module (SIM). This PIN is then mapped to a real network-address at a routing center to allow communications between correspondents. In those cases where the currently assigned address changes, the PIN number will remain permanent and addressable. This PIN is kept private, ensuring that only the assigned conversation names are seen.

Figure 4:
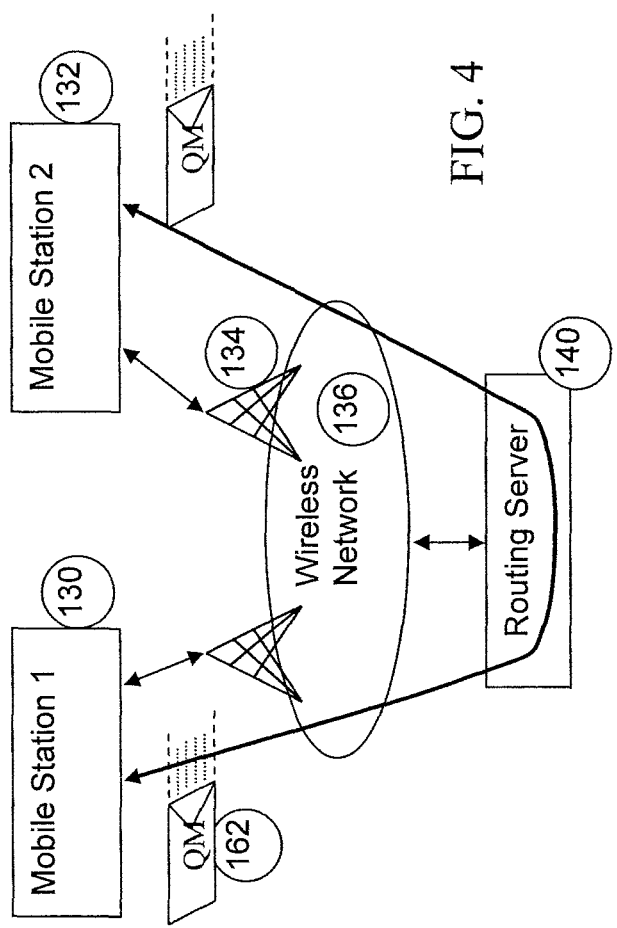
FIG. 4 is an illustration of two mobile stations (MS) connected to a wireless network.

Turning to FIG. 4 there is an illustration of two mobile stations (MS) 130 and 132 connected to a wireless network 136. Some common wireless network 136 that could be used include CDMA, GSM/GPRS, EDGE, UMTS, CPDP, Mobitex, DataTAC, Packet Radio and many other that are capable of exchange wireless data messages. Each network has base stations 134 that perform radio frequency (RF) protocols to support data and voice exchanges with mobile stations. Each MS shown can have various applications available on them, including e-mail, short message service (SMS), multi-media service (MMS), enhanced message service (EMS), Internet message service (IMS), and Quick Messaging (QM).

As MS 1 (130) wants to have a quick messaging conversation with MS 2 (132) an invitation is sent to MS 2 using one or more current messaging exchange methods. Methods like e-mail, SMS, EMS, MMS or a cell phone call can be used to exchange the identity. The cell phone method could be one of the best, as voice authentication would greatly enhance the ability to confirm the identity of the sender. When a cell phone/DTMF method is not used, either one two or more messages could be send over other data communication paths. Naturally, for one skilled in the art it would also be possible to be in the middle of a voice conversation with another person and send the invitation over the data channel while still on the call. This would also be a strong method for authentication. Once the invitation and acceptance is complete quick messages 162 can be exchanged through the Routing Server 140. The routing server 140 could be a modified Cisco TCP/IP router, a NAT (network address translation) server, or some comparable routing equipment capable of routing messages quickly. The routing server 140 uses the PIN information found in the header of the quick message 162 to determine how to reach the receiver.

Figure 5:
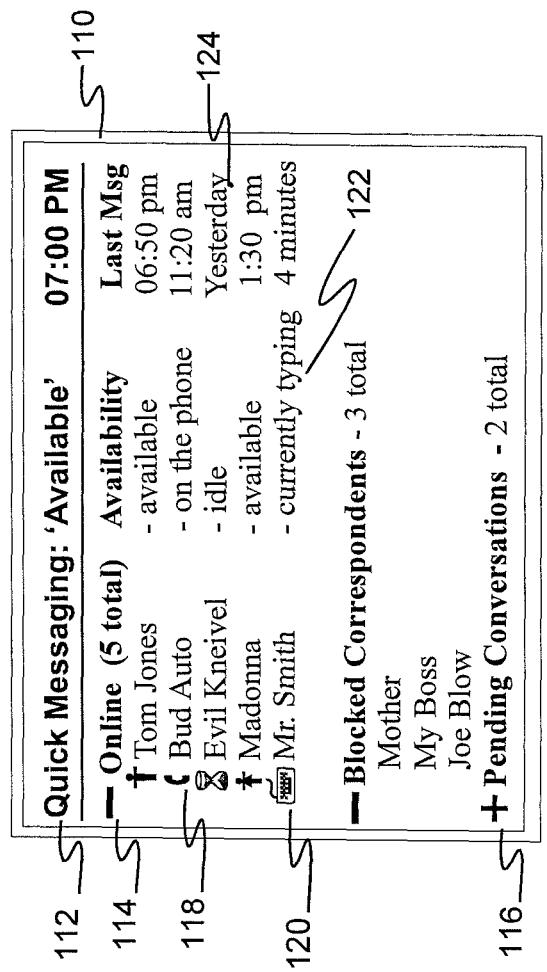
FIG. 5 is an illustration of a sample Quick Messaging main screen.

Turning to FIG. 5 there is an illustration of a sample Quick Messaging main screen 110. In this sample screen 110 the user is presented with the overall status information of the Quick Messaging Application. With a quick glace the user can confirm which screen they are viewing, the status of their Quick Messaging application and the current time 112. They can then view various groups, including the current conversations 114, Blocked Correspondents and Pending Conversations 116. This screen 110 also illustrates the use of availability as a replacement for presence information. In a mobile environment when using an always-on mobile station, the amount of information that can be used for availability rises dramatically. This is shown in greater detail in FIG. 6.

Also available is a quick view of the status and 'implied presence' information for each conversation 122. Icons 118 are also used to enhance the user's view of the status and save time. For example in the case of Mr. Smith, the keyboard icon 120 shows that he is currently typing a message in response to one received by this user, and that the last message received from him was 4 minutes ago. Each group can be expanded 116 or collapsed 114 depending on what the user wishes to view and the icon currently being shown. This screen also provides the time of the last quick message exchange 124. Since conversations can last weeks or months, the last message exchange provides a quick update as to which conversations are the most active and current. For one skilled in the art the format and layout of this screen could be done in many ways. The features and benefits of the screen is what this illustration is presented with respect to the principles in question.

Turning now to FIG. 6 there is an illustration of the main Quick Messaging screen with a wide range of conversations with varying availability statuses shown. As with existing Instant Messaging applications, the Quick Messaging application also associates an Icon to each status to help the user quick review the status of each Online users. However, unlike various other Messaging solutions, the Quick Messaging solution uses 'availability' and may ignore explicit 'presence' information. The availability information is tied to everything available from the mobile station. This includes the delivery of previous messages 130, the receiver reading the last message sent 132, cell phone calls that have been ignored 128 or accepted, a calendar event that has been reached in the calendar application 126, the user physically turning off their cell phone 136, the user typing back a message to the sender and many, many other similar type events. From these physical events on the mobile station an 'implied availability' can be conveyed to the correspondents of that user to enhance the experience of Quick Messaging. This unique invention helps to reduce wasted message, eliminates the need for 'explicit presence' messages, and provides a much more rich understanding of what each correspondent is doing.

If a given user does not want to be tracked this closely, they can terminate or block the information from leaving their device. It is important to remember that each correspondent has been 'security' invited into a conversation, so the privacy if much higher then in any other Instant Messaging solution. Additionally, by using the Block Quick Messaging menu choice 132, the other correspondents understand that the user in question has asked for complete privacy.

Figure 7:
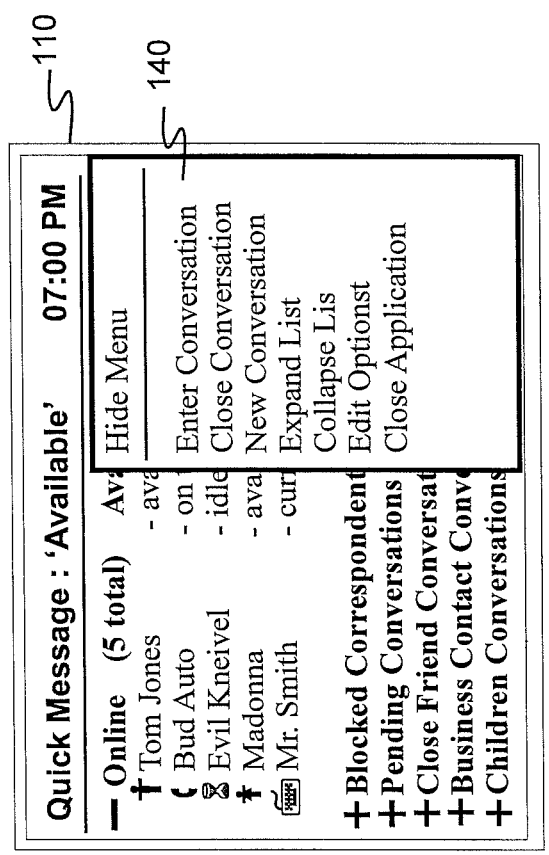
FIG. 7 is an illustration of invoking a menu within the Quick Messaging application.

Turning now to FIG. 7 this is an illustration of invoking a menu within the Quick Messaging application 110. The menu 140 can be invoked using a touch screen, keyboard input, a roller wheel, a mouse or some other input method. As shown the menu 140 provides the ability to dynamically open or close conversations with new users. It is also possible to expand or collapse various lists, like the 'Close Friend Conversations' quick messaging group list.

Also available to the user is the options menu selection. Opening the options allows the user to adjust operating parameters of the Quick Messaging application.

Figure 8:
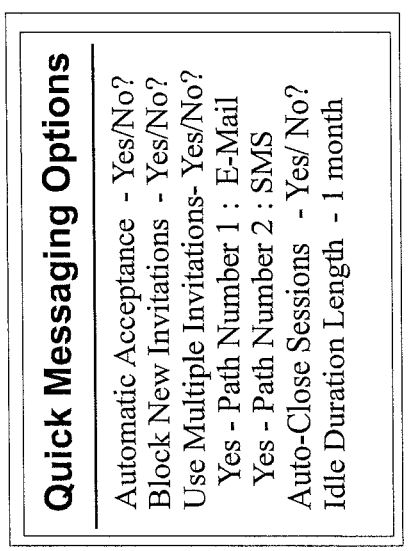
FIG. 8 is an illustration of an options screen for Quick Messaging.

Turning to FIG. 8 there is an illustration of an options screen for Quick Messaging. This is an example of what happens after the user selects the 'Edit Options' menu item. In this example the user is capable of automatically accepting Quick Messaging invitations, and blocking new invitations. Also part of this configuration is the ability to increase security and send the invitation over multiple communication paths. In this example the paths include E-Mail as the first path and SMS as the second path. Idle sessions can also be closed if needed.

In this example idle sessions are closed after 1 month of inactivity. For one skilled in the art it would be possible to include many other configuration items, but these are ones related to the principles herein.

Figure 9:
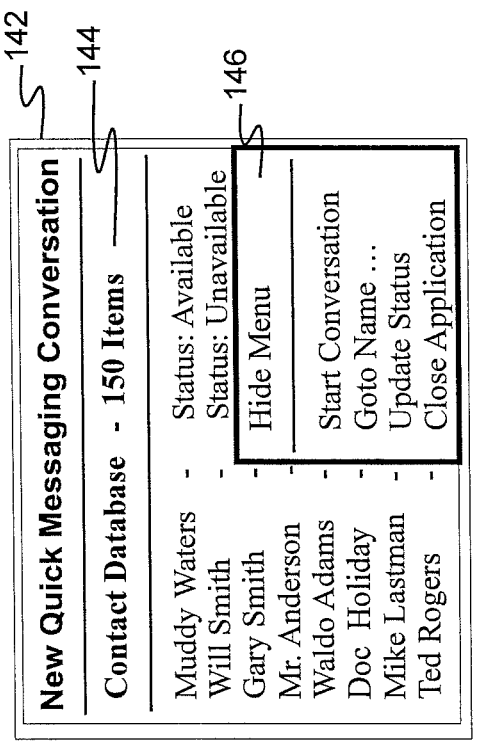
FIG. 9 is an illustration of opening a new conversation.

Turning now to FIG. 9 there is an illustration of opening a new conversation 142. In this example the user has selected the New Conversation menu item from FIG. 6, and the Contact Database 144 has been opened. Once the correct user has been reached, using cursor methods supported by the Mobile Station, another menu can be invoked 146. In this case the menu 146 allows the conversation to be started. The user can also update the current status of the user being reviewed or they can close the application.

Figure 10:
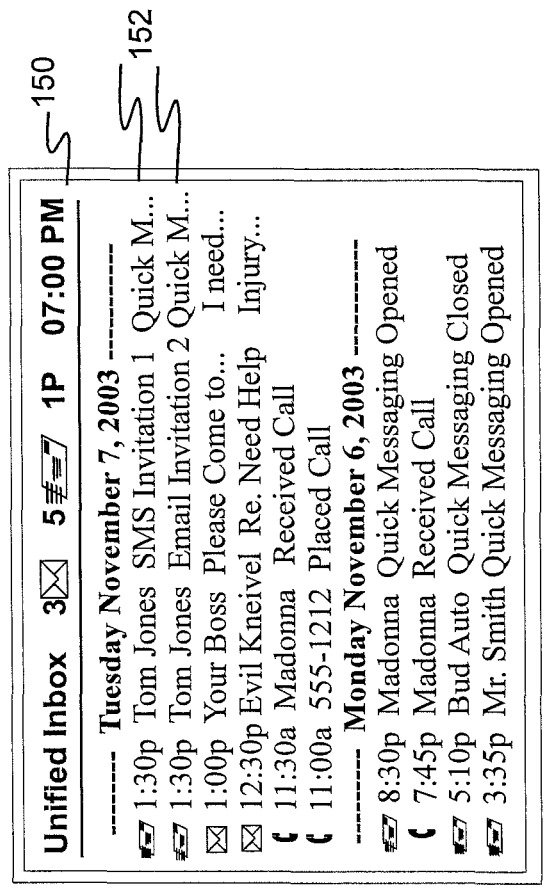
FIG. 10 is an illustration the effects of selecting the 'Start Conversation' menu item from FIG. 9.

Turning now to FIG. 10 this illustrates the effects of selecting the 'Start Conversation' menu item from FIG. 3. Since the Quick Messaging option indicated that multiple invitations should be sent 152, one via E-Mail and one via SMS. These two messages are shown to the user in the Unified Inbox view 150. This method of sending multiple messages through several data communication paths, offers higher security and strong authentication of the sender. This main messaging screen also illustrates how unread E-Mail messages and how many unread Quick Messages exist on the mobile station.

Figure 11:
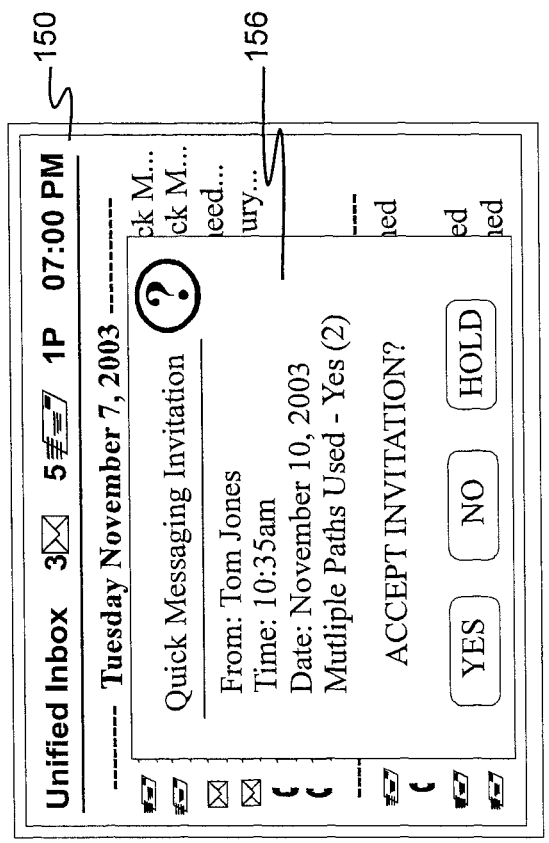
FIG. 11 is an illustration of a Quick Messaging invitation presented via a data communication path.

Turning now to FIG. 11 there is an illustration of a Quick Messaging invitation presented via a data communication path. In this embodiment the invitation has arrived via a data communication path like E-mail, SMS, MMS, or paging channel. These two messages are shown in FIG. 10 as viewed by the user in the Unified Inbox. When the invitation arrives the user could be current working in any sub-system of the mobile station, like the calendar, address book, tasks, message list or phone application. They would be notified as if any normal data message arrived onto the device, either vibrating or beeping or a combination of both. Once they move to the unified message listing 150, they can see the invitation that arrived from the user, in this case from Tom Jones. Tom the initiator has also configured his device to sent two invitations through multiple paths, those being E-Mail and SMS. When the user on the receiving mobile station opens either one of these messages it invokes the Quick Messaging application to process the unique message. For one skilled in the art this can be accomplished by the Quick Messaging application registering for message types that have special indicators to indicate that it is a Quick Messaging application.

Since the original message was sent knowing that two messages were leaving the sending mobile station, the message indicates that two messages must exist before an invitation can be accepted. Therefore, once either message is opened it scans the unified Inbox for the matching message before it presents the invitation to the user. If both messages are present, a dialog box 156 is presented to the user with the full information to accept, reject or postpone the acceptance of the Quick Messaging invitation. Part of the invention keeps the underlying 'address identity' secret from the acceptor. This makes passing the identity around impossible. Also the original message can ONLY be accepted by the receiver, as they are encoded for that receiver only. Therefore if the messages are forwarded to another receiver they cannot be used as a valid invitation.

Figures 12, 13:
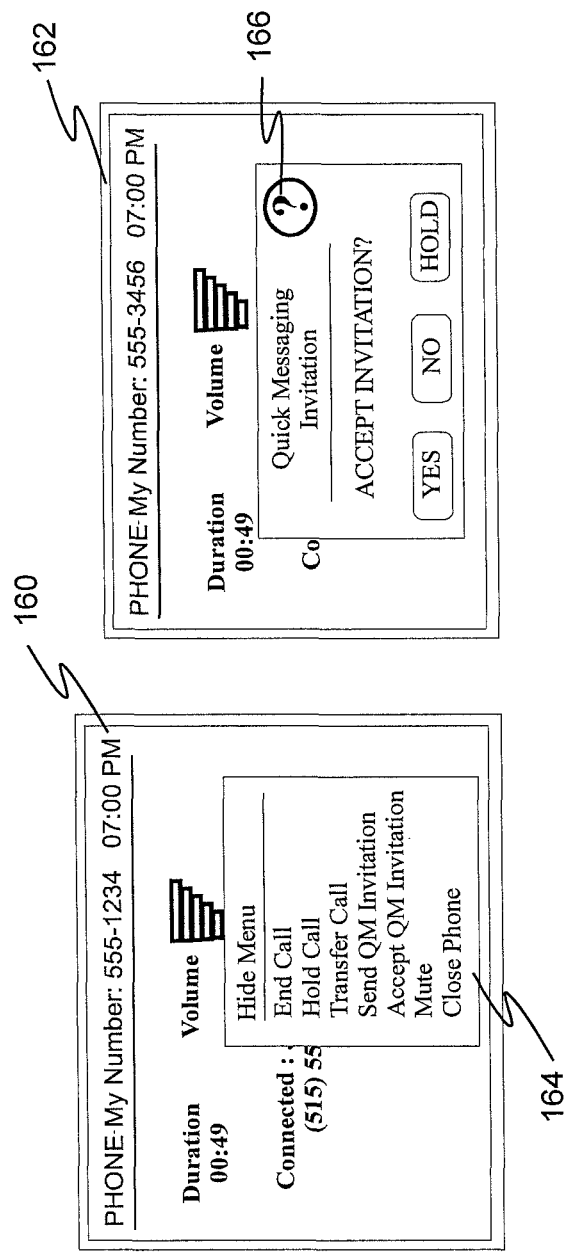
FIGS. 12 and 13 provide an illustration of an alternative embodiment for sending and receiving Quick Messaging invitations.

Turning now to FIGS. 12 and 13 there is an illustration of an alternative embodiment for sending and receiving Quick Messaging invitations. In FIG. 10 the invitation arrived via a data communications path, in this embodiment the invitation arrives via a circuit switched cell phone call. In this embodiment the initiator first initiates a phone call to the recipient to establish voice confirmation and authentication. This method offers the strongest authentication that the caller is indeed who they say they are. In this example the sender opens the Phone application and initiates a call 160. The receiver of the call, also ends up in the phone application once they accept the call 162.

While the call is open between the two users, a menu is invoked by the initiator 164. This can be invoked through cursor control, mouse activity, touch screen movement or a roller wheel clicking. There are a wide range of available options, but the one that is shown in this example is 'Send QM Invitation'. By sending a Quick Messaging invitation the sending device sends a series of DTMF tones through the voice circuit already connected. When the receiving party gets the first set of DTMF tones, a confirmation dialog box appears 66. This does assume that the receiving party does have the Quick Messaging application on their mobile station. From this dialog box 66, the accepting user has the option of accepting, rejecting or holding the invitation. The hold might be useful to double check with the sending party the reason for the invitation.

Once the user has pressed the 'YES' on the dialog box, or some similar acceptance response, further DTMF tones are exchanged. Through the full acceptance many DTMF tones are used to convey the information needed by both users. This includes their Quick Messaging name, their specialized PIN value, which is normally hidden from the user and other configuration and presence information. This underlying 'address identity' is kept secret to help improve privacy and to ensure that only people that are invited accept invitations. Since identities cannot be shared, unwanted invitations will not be received and Quick Messaging cannot be loaded with junk mail and spam information.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A method of operating a first mobile station, the first mobile station comprising a presence setting, the method comprising the first mobile station:
   determining from at least one activity detected on the first mobile station, an indication of availability; and
   sending an availability message comprising the indication of availability to at least one second mobile station associated with a contact for the first mobile station to enable the at last one second mobile station to display the indication of availability for the first mobile station instead of the presence setting together with time information indicating a latest messaging activity with the contact.

2. The method of claim 1, wherein the at least one activity corresponds to at least one messaging activity.

3. The method of claim 2, wherein the at least one messaging activity comprises any one or more of: delivery of a message, reading a message, and typing back a message.

4. The method of claim 1, wherein the at least one activity corresponds to any one or more of: ignoring a phone call, accepting a phone call, a calendar event, and turning off the first mobile station.

5. The method of claim 1, further comprising receiving at least one availability message from a contact for the first mobile device, and displaying an icon indicative of availability of the contact.

6. The method of claim 5, further comprising receiving at least one additional availability message from the contact and changing the icon to reflect a current availability.

7. A method of operating a first mobile station, the method comprising the first mobile station:
   receiving an availability message from a second mobile station, the second mobile station being a contact for the first mobile station, the availability message comprising an indication of availability having been determined by the second mobile station from at least one activity detected on the second mobile station; and
   displaying the indication of availability for the second mobile station instead of a presence setting for the second mobile station; and
   displaying time information in association with the indication of availability, the time information indicating a latest messaging activity with the contact.

8. The method of claim 7, wherein the at least one activity corresponds to at least one messaging activity.

9. The method of claim 8, wherein the at least one messaging activity comprises any one or more of: delivery of a message, reading a message, and typing back a message.

10. The method of claim 7, wherein the at least one activity corresponds to any one or more of: ignoring a phone call, accepting a phone call, a calendar event, and turning off the second mobile station.

11. The method of claim 7, further comprising displaying an icon indicative of availability of the contact.

12. The method of claim 11, further comprising receiving at least one additional availability message from the contact and changing the icon to reflect a current availability.

13. A non-transitory computer readable medium comprising computer executable instructions for operating a first mobile device, the first mobile station comprising a presence setting, the computer executable instructions comprising instructions for:
   determining from at least one activity detected on the first mobile station, an indication of availability; and
   sending an availability message comprising the indication of availability to at least one second mobile station associated with a contact for the first mobile station to enable the at last one second mobile station to display the indication of availability for the first mobile station instead of the presence setting together with time information indicating a latest messaging activity with the contact.

14. The non-transitory computer readable medium of claim 13, further comprising instructions for receiving at least one availability message from a contact for the first mobile device, and displaying an icon indicative of availability of the contact.

15. A first mobile device comprising a processor, a display, a presence setting, and memory, the memory comprising computer executable instructions that when executed by the processor, operate the first mobile device to:
   determining from at least one activity detected on the first mobile station, an indication of availability; and
   sending an availability message comprising the indication of availability to at least one second mobile station associated with a contact for the first mobile station to enable the at last one second mobile station to display the indication of availability for the first mobile station instead of the presence setting together with time information indicating a latest messaging activity with the contact.

16. A non-transitory computer readable medium comprising computer executable instructions for operating a first mobile device, the computer executable instructions comprising instructions for:
   receiving an availability message from a second mobile station, the second mobile station being a contact for the first mobile station, the availability message comprising an indication of availability having been determined by the second mobile station from at least one activity detected on the second mobile station;
   displaying the indication of availability for the second mobile station instead of a presence setting for the second mobile station; and
   displaying time information indicating a latest messaging activity with the contact.

17. The non-transitory computer readable medium of claim 16, further comprising instructions for displaying an icon indicative of availability of the contact.

18. A first mobile device comprising a processor, a display, and memory, the memory comprising computer executable instructions that when executed by the processor, operate the first mobile device to:
- receiving an availability message from a second mobile station, the second mobile station being a contact for the first mobile station, the availability message comprising an indication of availability having been determined by the second mobile station from at least one activity detected on the second mobile station;
- displaying the indication of availability for the second mobile station instead of a presence setting for the second mobile station; and
- displaying time information indicating a latest messaging activity with the contact.

* * * * *